Nov. 1, 1960

R. C. BUCK 2,958,566

SMALL PARTS TRAY FOR AUTOMOBILES

Filed March 4, 1957

INVENTOR.
Robert C. Buck

BY

ATTORNEY.

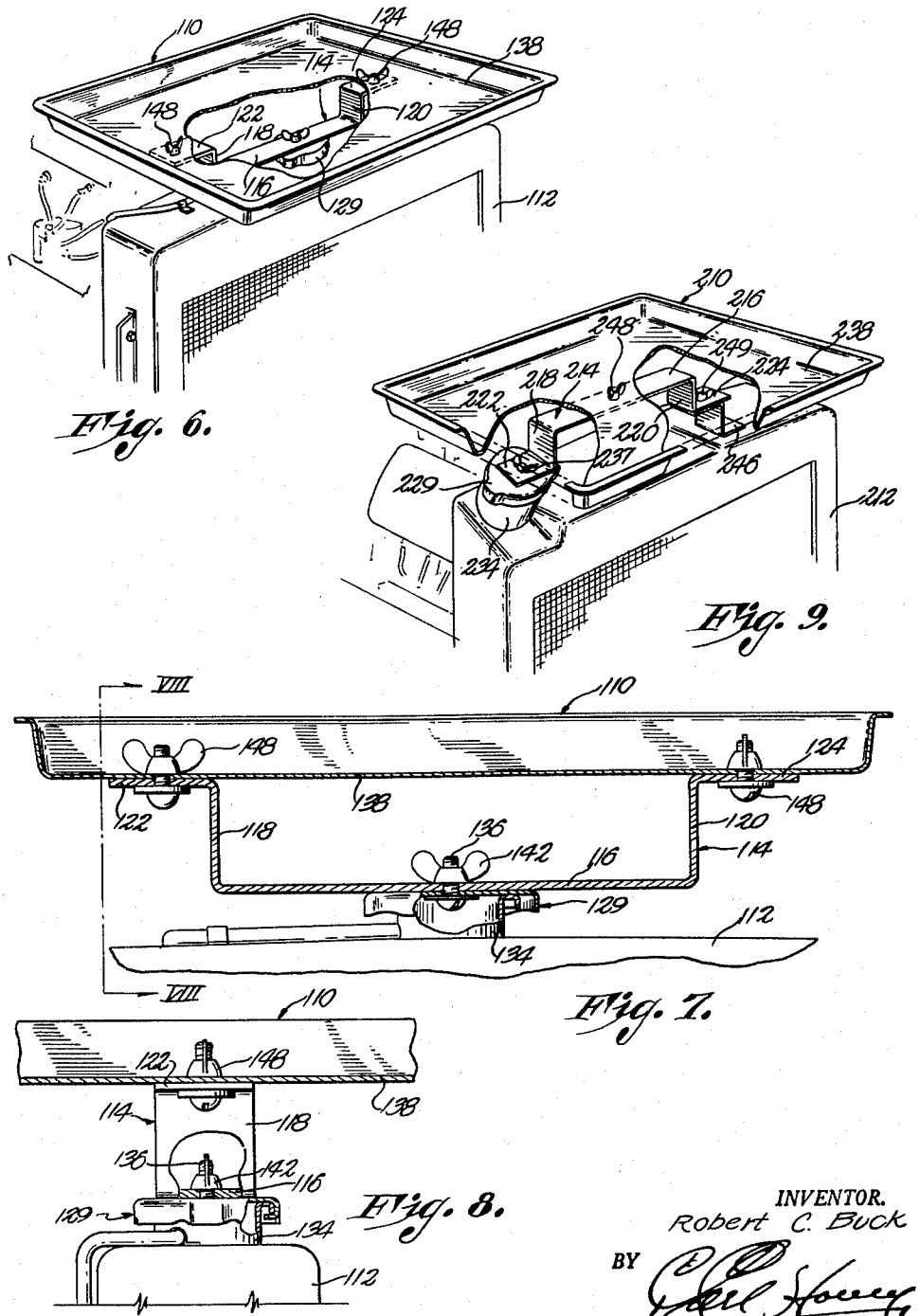

United States Patent Office 2,958,566
Patented Nov. 1, 1960

2,958,566

SMALL PARTS TRAY FOR AUTOMOBILES

Robert C. Buck, 10605 E. 26th Terrace,
Independence, Mo.

Filed Mar. 4, 1957, Ser. No. 643,709

1 Claim. (Cl. 311—21)

This invention relates to automotive accessories, and more particularly to apparatus for use by a mechanic during repair of an automobile to receive small parts such as bolts, nuts, screws, washers and even lightweight tools.

Many have experienced, during repair of an automobile or the like, the difficulty of keeping together the various parts that are disassembled during the time of repair. Mechanics particularly, being anxious to avoid loss of time, are especially aware of the need for an easily accessible tray for receiving such small parts and avoiding loss or misplacement thereof. Simple containers are unsatisfactory for the reason that for the most part, it is difficult to find a suitable support around the engine and other parts of the automobile for such container.

It is the most important object of the instant invention, therefore, to provide a tray having means thereon permitting attachment of the tray to the radiator of the automobile in a convenient location for the above described use.

Another important object of the present invention is to utilize the radiator inlet spout as a means of supporting the tray.

A still further object of the present invention is to provide a novel bracket depending from the tray and rotatable with respect thereto whereby the same may be attached to the radiator spout in much the same manner as the radiator cap.

In the drawing:

Fig. 6 is a perspective view of a small parts tray for automobiles made pursuant to another embodiment of the instant invention.

Fig. 7 is an enlarged, vertical, cross-sectional view through the tray shown in Fig. 6.

Fig. 8 is a fragmentary, transverse, cross-sectional view taken on line VIII—VIII of Fig. 7; and Fig. 9 is a perspective view of a small parts tray for automobiles substantially in the nature of that illustrated in Fig. 6.

Figure 1:
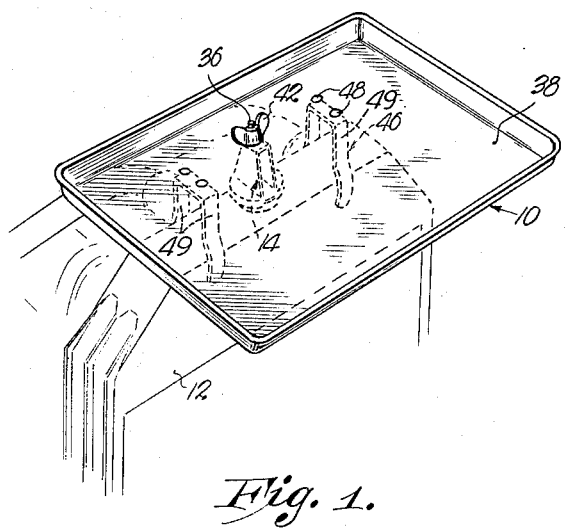
Figure 1 is a perspective view of a small parts tray for automobiles made pursuant to one form of my invention.
Figure 4:
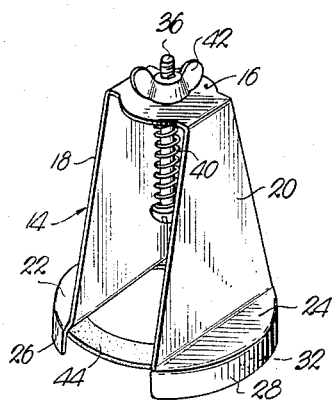
Fig. 4 is an enlarged, perspective view of one of the mounting brackets.

The particular nature of tray 10 chosen for illustration of the principles of the instant invention shown in Figs. 1 to 5 inclusive, is of little consequence other than the fact that it is to be preferred that the same be relatively shallow, rendering the same more easily used for the purposes intended.

Two expedients usable together or separately as desired, are shown in the drawing for mounting the tray 10 upon radiator 12 of an automobile or other automotive vehicle. One of such expedients includes a U-shaped bracket 14 having a perforated bight 16 and a pair of legs 18 and 20 integral with, and depending from, the bight 16. Legs 18 and 20 are provided with outwardly extending wings 22 and 24, each defining the segment of a circle and in turn being provided with downturned, arcuate flanges 26 and 28.

Diametrically opposed, inturned ears 30 and 32 integral with the flanges 26 and 28 respectively at their lowermost arcuate edges, are adapted to interlock with water inlet spout 34 of radiator 12 in much the same manner as the radiator cap (not shown) that is normally mounted on the spout 34.

Figure 2:
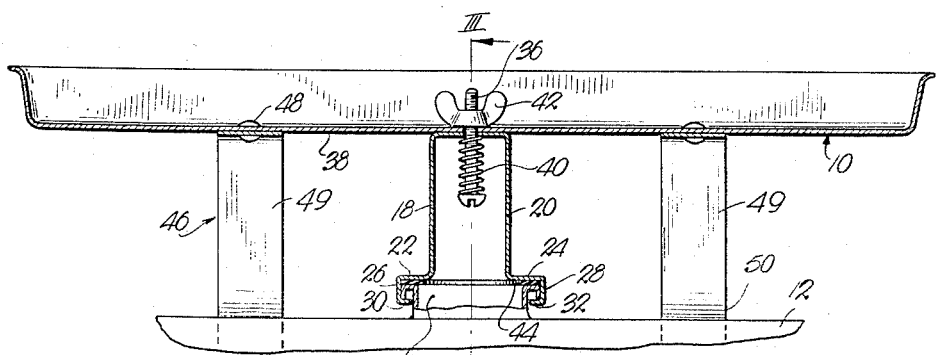
Fig. 2 is an enlarged, vertical, cross-sectional view taken on line II—II of Fig. 3.
Figure 3:
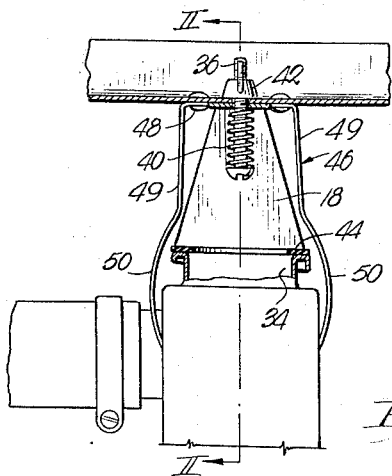
Fig. 3 is a fragmentary, transverse, cross-sectional view taken on line III—III of Fig. 2.
Figure 5:
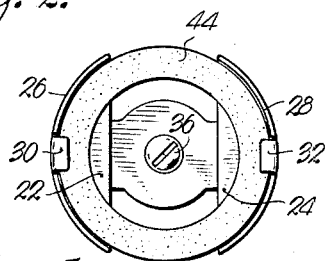
Fig. 5 is a bottom view of the bracket shown in Fig. 4.

To the end that the bracket 14 may be rotated and thereby attached to, and removed from the spout 34, a bolt 36 extends through the bight 16 and through bottom 38 of tray 10 as best illustrated in Figs. 2 and 3. The tension of a spring 40 coiled about the bolt 36 beneath bight 16, may be adjusted through the medium of wing nut 42 on bolt 36.

A tight fit between bracket 14 and the spout 34 is assured by use of an annular band 44 of resilient material disposed beneath the wings 22 and 24 and embraced by the flanges 26 and 28 above ears 30 and 32.

Accidental displacement of the tray 10 about the axis of spring-loaded bolt 36, is prevented through the medium of a pair of identical U-shaped, resilient brackets 46, one on each side respectively of the bracket 14 and secured to the bottom 38 of tray 10 by suitable fasteners 48. The U-shaped brackets 46 are preferably made from spring steel or the like and the legs 49 thereof terminate in opposed, arcuate fingers 50 which embrace the radiator 12 at the uppermost edge of the latter when the tray 10 is mounted on the spout 34 in the manner illustrated by Figs. 1–3.

As above indicated, the brackets 46 are not essential if the bracket 14 is employed, and conversely, the brackets 46 are capable of themselves of supporting the tray 10 on the radiator 12 with the bottom 38 resting directly on the spout 34, thereby rendering the use of bracket 14 unnecessary.

In the embodiment of my invention illustrated in Figs. 6–8, there is provided a U-shaped bracket 114 for tray 110 having a perforated bight 116 and a pair of legs 118 and 120 integral with and extending upwardly from bight 116. Legs 118 and 120 are provided with outwardly extending wings 122 and 124 releasably attached to bottom 138 of tray 110 through the medium of suitable fasteners 148.

A conventional radiator cap 129, adapted to engage and interlock with water inlet spout 134 of radiator 112 is rotatably secured to the bight 116 therebeneath and intermediate the ends of the bight 116 through the medium of a bolt 136 having a wing nut 142 thereon, permitting removal of the quickly releasable spout-engaging means 129 from the bracket 114.

In some instances however, automobiles are provided with radiators 212 as shown in Fig. 9, wherein spout 234 thereof is disposed adjacent one vertical edge thereof and slanting forwardly. In order to adapt the bracket 114 and the cap 129 for use with radiator 212, it is but necessary to remove bracket 114 from the tray 110 by releasing fasteners 148 and to remove the cap 129 from the bight 116 by releasing fastening means 136 and 142. Thereupon, one of the wings 222 of bracket 214 is twisted slightly and cap 229 rotatably secured thereto through use of fastening means 136 and 142 which is designated broadly in Fig. 9 by the numeral 237.

An opening is thereupon provided in bottom 238 of tray 210 for attaching bight 216 of bracket 214 thereto, through the medium of fastening means 248. Thereupon, a Z-shaped foot or the like 246, is releasably mounted on the other wing 224 of bracket 214 through fastening means 249. When the tray assembly shown in Fig. 9 is placed in use, the foot 246 cooperates with the spout 234 in supporting the tray 210, the twisting of wing 222 accommodating for the angularity of spout 234, whereby the tray 210 is supported in a horizontal position.

It is to be noted in the embodiment of Fig. 9 that bight 216 is attached to bottom 238 in engagement therewith, and that legs 218 and 220 depend from the bight 216 and, therefore, from the bottom 238 in much the same manner as in the bracket 14 of the embodiment shown in Figs. 1 to 5 inclusive.

From the foregoing it is seen that the tray is held in a position where a mechanic working on the automobile may use the tray to receive removed parts such as bolts, nuts, screws and the like, and to a limited extent, certain small tools, thereby eliminating the hazard of losing such parts or experiencing loss of time in locating the same when the various parts of the automobile are to be reassembled after repair.

Having thus described the invention what is claimed as new and desired to be secured by Letters Patent is:

Apparatus for use by a mechanic to receive small parts during repair of an automobile comprising a relatively shallow tray having quickly releasable means for attaching the same to the water inlet spout of the radiator of said automobile in lieu of the radiator cap, utilizing the means on the spout normally functioning to hold said cap in place, there being a U-shaped bracket releasably secured to the tray in depending relationship thereto and having said spout-engaging, releasable means rotatably mounted thereon.

References Cited in the file of this patent

UNITED STATES PATENTS

| | | |
|---|---|---|
| 727,157 | Lake | May 5, 1903 |
| 1,155,043 | Cilley | Sept. 28, 1915 |
| 1,598,544 | Tanquary | Aug. 31, 1926 |
| 1,698,753 | Fischer | Jan. 15, 1929 |
| 1,709,623 | Langer | Apr. 16, 1929 |
| 1,723,238 | Hoot | Aug. 6, 1929 |
| 1,919,189 | Andrie | July 25, 1933 |
| 1,955,209 | Tyler | Apr. 17, 1934 |
| 2,452,116 | Felton | Oct. 26, 1948 |
| 2,585,299 | Cook | Feb. 12, 1952 |
| 2,647,716 | Hudziak et al. | Aug. 4, 1953 |
| 2,805,778 | Yordi | Sept. 10, 1957 |
| 2,827,556 | Kersey | Mar. 18, 1958 |
| 2,884,215 | Weidner | Apr. 28, 1959 |